Patented Oct. 10, 1944

2,360,289

UNITED STATES PATENT OFFICE 2,360,289

METHOD OF INCORPORATING COLORING MATERIALS IN GELATIN

Deane S. Thomas, Jr., United States Army, assignor to Eastman Kodak Company, Rochester, N. Y., a corporation of New Jersey No Drawing. Application March 31, 1943, Serial No. 481,343

3 Claims. (Cl. 95—7)

This invention relates to photography and particularly to a method for incorporating coloring materials in gelatin or other water-soluble colloidal material.

The invention relates especially to the incorporation in gelatin of coloring materials such as dyes and dye intermediates, for example, couplers which combine with the development product of primary aromatic amino developing agents to form dyes in sensitive emulsion layers.

Couplers are usually incorporated in gelatino-silver halide emulsion layers by forming the sodium salt of the coupler which is soluble in the gelatin or by dissolving the coupler in a water-soluble solvent such as acetone and then adding the mixture to the emulsion. More recently it has been proposed to dissolve the coupler in a non-volatile, water-insoluble solvent for the coupler and to disperse particles of the mixture in the emulsion. This method is described in Mannes & Godowsky U. S. Patent 2,304,940, granted December 15, 1942, and in Jelley and Vittum U. S. Patent 2,322,027, granted June 15, 1943. Dyes have been similarly incorporated in photographic gelatin layers by dissolving them in a water-insoluble non-volatile solvent and dispersing the mixture in the gelatin as described in Sheppard U. S. Patent 1,290,794, granted January 7, 1919, and Fierke, Vittum and Wilder U. S. Patent 2,322,006, granted June 15, 1943.

When a dye or other substance is dissolved in a volatile water-soluble solvent such as acetone or alcohol, the solution is then usually mixed with 10–20 volumes of a melted solution of gelatin. The dye is precipitated during mixing and the solvent may remain in the dispersion or may be removed by evaporation.

This method of introducing a dye into gelatin has several disadvantages. The mixing of the aqueous gelatin with the acetone solution of the dye with consequent precipitation of the dye is critical and difficult to reproduce as far as the optical qualities of the dispersion are concerned. The solvent is difficult to remove from the dispersion because it is dissolved in the aqueous medium. To remove the solvent from set gelatin is especially difficult because this requires its diffusion through the solid mass. If, on the other hand, any of the solvent is left in the gelatin, its presence may be harmful. Melting of the dispersion often results in crystallization of the dye, with deterioration of its optical qualities, if the dispersion contains any appreciable amount of solvent. Even in set gelatin stored in a refrigerator, the dye will be transformed slowly to a crystalline or semi-crystalline state which generally is of no value optically. Also, the presence of much solvent tends to make the gelatin difficult to set.

It is, therefore, an object of the present invention to provide a method for incorporating a coloring material such as dye or coupler, in gelatin, which avoids the aforementioned disadvantage. A further object is to provide a method for incorporating a coloring material in gelatin without the presence of a solvent for the coloring material in the set gelatin. A still further object is to provide a dyed gelatin layer having improved optical properties. A still further object is to provide a novel method for incorporating couplers in sensitive emulsion layers. Other objects will appear from the following description of my invention.

These objects are accomplished by dissolving the dye or other coloring material in a volatile, water-immiscible solvent for the coloring material, such as chloroform, and dispersing the solution in extremely fine droplets in the carrier, such as melted gelatin, after which the solvent is removed by evaporation.

In preparing a gelatin coating containing coloring material according to my invention, the coloring material is first dissolved in a volatile water-immiscible solvent and the solution then emulsified in a melted gelatin solution. Emulsification may be effected by passing the mixture through a colloid mill or in any other suitable way and improved results are usually obtained by adding a wetting or dispersing agent to the gelatin. After emulsification, the mixture is chilled to cause the gelatin to set and when thoroughly cold the emulsion is shredded. The shreds are placed in a suitable container and subjected to reduced pressure. This removes the volatile solvent from the gelatin. Since the vapor pressure of the solvent will be undiminished until it is all vaporized, it is easily removed merely by subjecting the shredded dispersion to a vacuum. However, with solvents having a higher boiling point than chloroform, the evaporation of the solvent is aided by raising the temperature above room temperature but not above the melting point of the gelatin. The microscopic droplets of solvent are vaporized, thereby depositing the coloring material in a state which usually has excellent optical properties. The huge increase in volume of each droplet on vaporization enab'es it to burst out of the gelatin and no slow process of diffusion is involved.

The solvents employed in my process should fulfill the following requirements:

(a) Low solubility in water.
(b) High solvent action for the coloring material to be dispersed.
(c) Sufficiently low boiling point so that it can be removed at a temperature below the melting point of the gelatin.

In general, the solvent should have a boiling point not greater than 100° C. The following solvents are suitable for use according to my invention:

| | B. P. °C. |
|---|---|
| Chloroform | 61.2 |
| Carbon tetrachloride | 76 |
| 1,1,2-trichloro-1,2,2-trifluoroethane | |
| Cyclohexane | 80.8 |
| Ligroin | 70–100 |
| Benzene | 80.4 |

In making the dispersions about one volume of the chloroform solution of dye may be mixed with about 3 to 20 or more volumes of gelatin or other carrier, one to five volumes being a convenient ratio. The more chloroform or other solvent used, the finer is the resulting dispersion.

As stated above, my method is applicable to the preparation of dispersions of dyes or couplers in gelatin or other water-soluble carrier. The method is applicable to any dye of fairly high solubility in the volatile solvent such as chloroform. The following dyes are suitable, although this list is representative only:

Methyl red
1-benzeneazo-2-naphthol
4-hydroxy-2-methylazobenzene
p-Nitrobenzeneazo resorcinol
Azomethine dye from 2-cyanoacetyl coumarone and 2-amino-5-diethylamino toluene The dyes are usually incorporated in plain gelatin for the preparation of filter layers, antihalation layers, overcoating layers, etc., while couplers which combine with the development product of primary aromatic amino developing agents are incorporated in silver halide emulsion layers. The preparation of the dispersions of couplers is similar to that of the dyes except that the coupler is finally incorporated in a silver halide emulsion.

The following couplers have been found suitable for incorporation in silver halide emulsions according to my invention.

o-Lauryl phenol
1-phenyl-3-pentadecyl-5-pyrazolone
2-hydroxy-4'-p-tert.butylphenoxypropinonamido-diphenyl
5-(N-benzyl-N-naphthalene-β-sulfonamido)-1-naphthol
N-n-amyl-2-cyanoacetylcoumarone-5-p-amyl-sulfonanilide
1-(3,5-dimethylphenoxy phenyl)-3-hydroxy-5-p-amyloxy-benzoyliminopyrazolone
p-(t-butylphenoxy) ethyl-p-benzoylacetaminobenzene sulfonate
4-(benzoyl acetamino)α-(4'-tert. butyl phenoxy) propionanilide My invention will now be described by reference to the following examples which relate to the specific manner of preparing dispersions according to my invention:

*Example 1*

A dispersion of dye in gelatin was prepared by dissolving 0.1 gram of 1-benzeneazo-2-naphthol in 20 cc. of chloroform and emulsifying this solution with 50 cc. of melted 5% gelatin solution. Emulsification was effected by passing the mixture through a colloid mill prior to which 0.25 grams of sodium triisopropyl naphthalene sulfonate had been added as a wetting agent. After emulsification the mixture was chilled to cause the gelatin to set and when thoroughly cold the emulsion was shredded. The shreds were then subjected to a reduced pressure of about 20 mm. of mercury which caused the chloroform to volatilize. After a few minutes, all of it had been removed. The resulting gelatin containing a dispersion of the dye was then coated on a support in a normal manner.

*Example 2*

In 20 cc. of chloroform there was dissolved 0.1 gram of o-lauryl phenol. This solution was emulsified with 50 cc. of a melted 5% gelatin solution by passing the mixture through a colloid mill. A wetting agent was previously added to the gelatin as described in Example 1. After emulsification the mixture was chilled set and shredded and the chloroform evaporated as described in Example 1. The resulting dispersion was melted and added to 500 cc. of a melted gelatino-silver halide emulsion with thorough mixing. This emulsion was coated and dried in the usual manner. Upon exposure and development in a developing solution employing 2-amino-5-diethylamino toluene as the developing agent and subsequent removal of silver, a cyan dye image was obtained.

The examples contained herein are illustrative only and are not to be taken as limiting the scope of my invention. Although I have referred to chloroform as the volatile solution and to gelatin as the carrier material, it will be understood that any low boiling water-immiscible organic solvent for the dye or other coloring material may be used. Instead of gelatin, any water-soluble or water-permeable colloidal material may be used as the carrier, such as albumen, collodion or water-permeable cellulose esters or synthetic resins. The method may be employed to prepare a dispersion of any coloring material whether solid or liquid in any carrier which is in a liquid state at the time the dispersion is prepared, whether it is later set or solidified or neither, using a volatile solvent in which the coloring material is sufficiently soluble for the purpose and which is, itself, sufficiently immiscible with the solution of the carrier.

My method may be employed for the preparation of dispersions of dyes for the production of filter layers or multi-layer color films, antihalation layers and for special uses such as the dispersion of a white substance in the carrier for the production of translucent materials or diffusing screens.

Numerous modifications may be made in my invention within the scope of the appended claims.

I claim:

1. The method of incorporating a coloring material selected from the group consisting of dyes absorptive of visible light and color couplers in a water-soluble photographic colloid, which comprises mixing said coloring material having a high solubility in a water-insoluble organic solvent therefor having a boiling point below about 100° C., with said solvent in the absence of other solvent, dispersing said solution in the photographic colloid to form dispersed particles of solvent and coloring material in said colloid, and evaporating the solvent from said colloid to leave dispersed particles of coloring material therein.

2. The method of incorporating a dye in photographic gelatin which comprises mixing a dye having a high solubility in a water-insoluble organic solvent having a boiling point below about 100° C., with said solvent in the absence of other solvent, dispersing said solution in the gelatin to form dispersed particles of solvent and dye in said gelatin, and evaporating the solvent from said gelatin to leave dispersed particles of dye therein.

3. The method of incorporating an azo dye uniformly in sensitized photographic gelatin which comprises mixing an azo dye having a high solubility in a water-insoluble organic solvent having a boiling point below about 100° C., with said solvent in the absence of other solvent, dispersing said solution in the gelatin to form dispersed particles of solvent and dye in said gelatin, and evaporating the solvent from said gelatin to leave dispersed particles of dye therein.

4. The method of incorporating an azo dye in unsensitized photographic gelatin which comprises mixing an azo dye having a high solubility in chloroform, with said chloroform in the absence of other solvent, dispersing said solution in the gelatin to form dispersed particles of chloroform and dye in said gelatin and evaporating the chloroform from said gelatin under vacuum to leave dispersed particles of dye therein.

5. The method of incorporating a color-forming compound in a silver halide emulsion which comprises mixing a color forming compound capable of coupling with the development product of a primary aromatic amino developing agent and having a high solubility in a water-insoluble organic solvent having a boiling point below about 100° C., with said solvent in the absence of other solvent, dispersing said solution in the emulsion to form dispersed particles of solvent and color former in said emulsion and evaporating the solvent from said emulsion to leave dispersed particles of color former therein.

6. The method of incorporating a color former in a gelatino-silver halide emulsion which comprises mixing a color former capable of coupling with the oxidation product of a primary aromatic amino developing agent and having a high solubility in a water-insoluble organic solvent having a boiling point below about 100° C., with said solvent in the absence of other solvent, dispersing said solutions in the gelatino-silver halide emulsion to form dispersed particles of solvent and color former in said emulsion and evaporating the solvent from said emulsion to leave dispersed particles of color former therein.

DEANE S. THOMAS, Jr.